April 9, 1940.　　　C. A. LONGSTREET　　　2,196,317
LEAKAGE TESTING MACHINE
Filed July 12, 1939　　　3 Sheets-Sheet 1
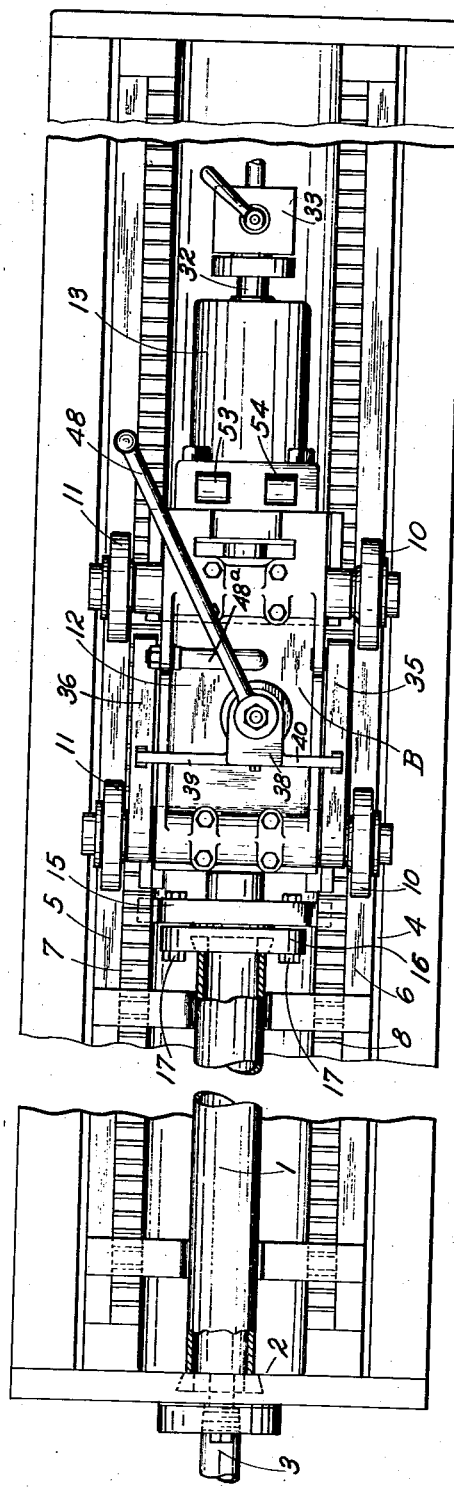
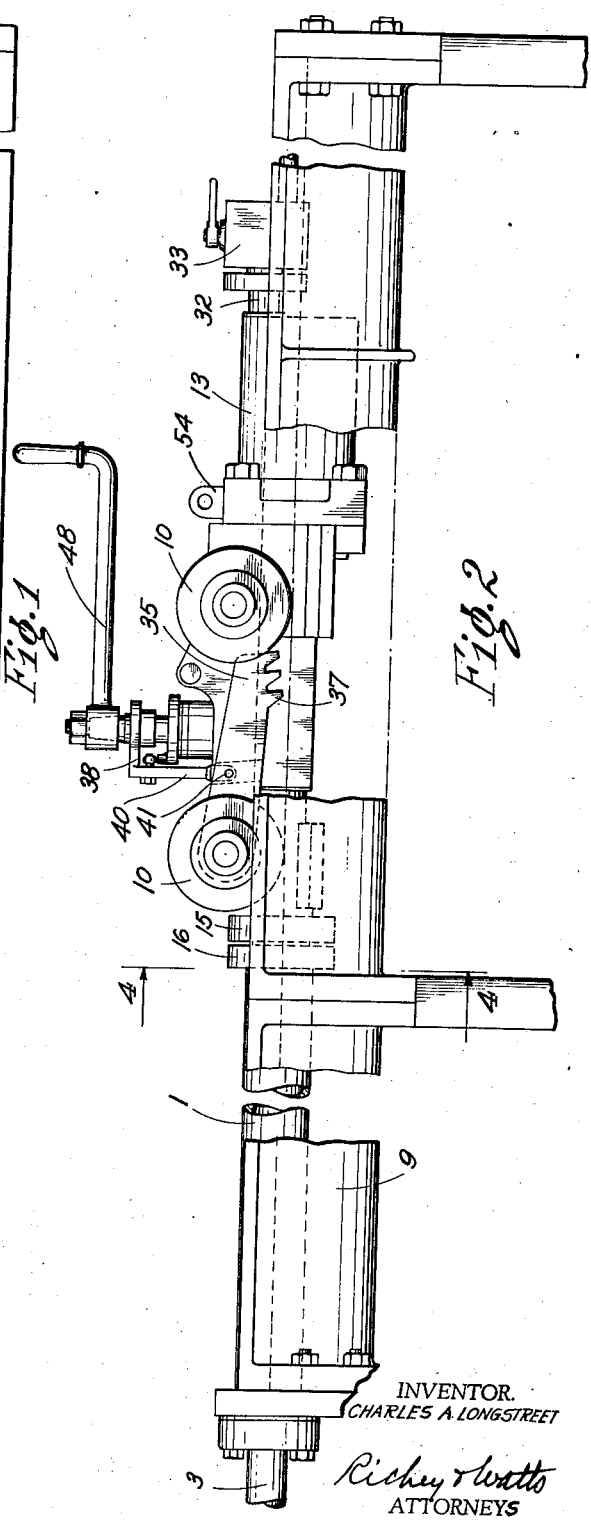
INVENTOR.
CHARLES A. LONGSTREET
Richey & Watts
ATTORNEYS

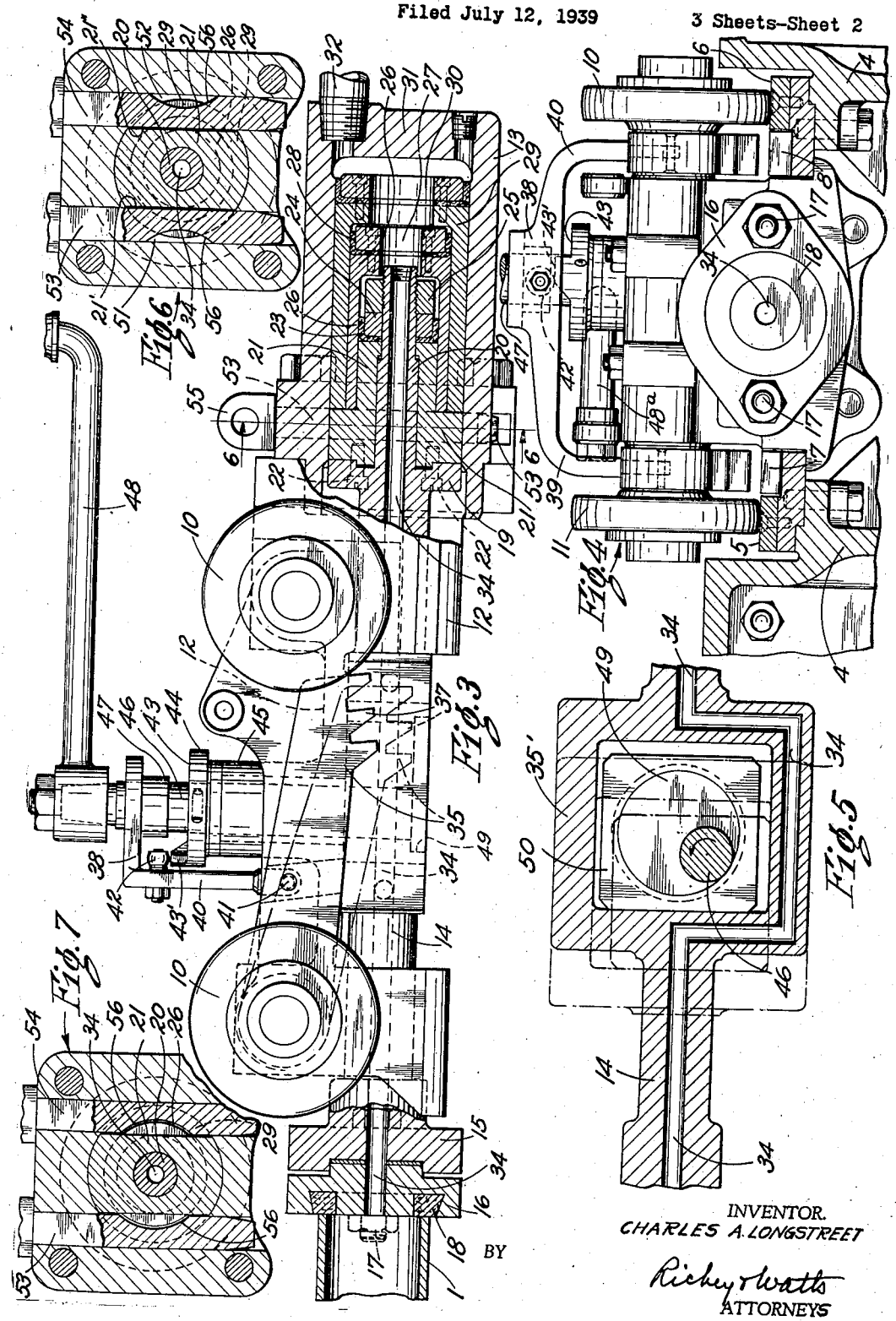

April 9, 1940.   C. A. LONGSTREET   2,196,317
LEAKAGE TESTING MACHINE
Filed July 12, 1939   3 Sheets-Sheet 3
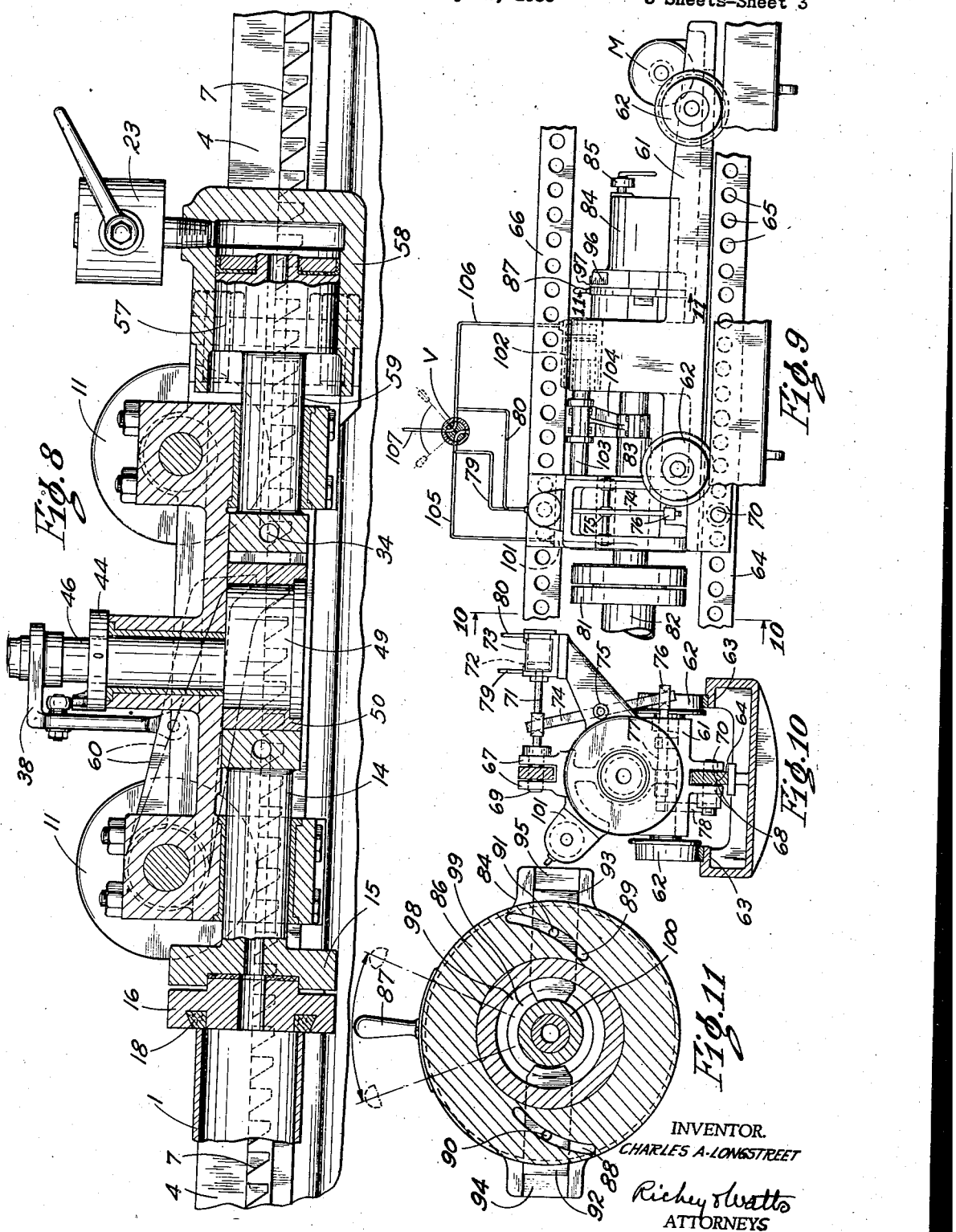
INVENTOR.
CHARLES A. LONGSTREET
Richey & Watts
ATTORNEYS Patented Apr. 9, 1940

2,196,317

UNITED STATES PATENT OFFICE 2,196,317

LEAKAGE TESTING MACHINE

Charles A. Longstreet, Youngstown, Ohio

Application July 12, 1939, Serial No. 284,049

14 Claims. (Cl. 73—51)

This invention relates to hydrostatic testing apparatus and more particularly to an improved apparatus for hydrostatic pressure testing welded or seamless tubing or pipe.

It is common practice to test hollow articles for leaks and defects by applying fluid under pressure to the article. In the testing of elongated tubes or pipes the tube is usually set up between two end sealing members and water or other testing fluid forced into the tube through one of the end seals. Machines have previously been designed for pipe testing having one stationary seal and another sealing member which is movable in order to accommodate different lengths of pipe or tube. In some of these devices the fluid under pressure which is used to test the tube is also applied to a piston which forces the end of one of the end sealing members against the pipe and creates the force necessary to prevent leakage around both of the end seals while the testing pressure is applied.

My present invention relates to certain improvements in pipe testing machines of this general type, and it is among the objects of my invention to provide a pipe tester which is adapted to test pipes of widely different diameters; the provision of a hydrostatic pipe tester in which the pressure exerted to seal the ends of the tube can readily be varied so that a relatively small pressure is applied to small diameter tubes and a relatively heavy pressure applied to larger diameter tubes; the provision of a pipe tester buggy having simple and convenient means for locking the buggy against movement on its supporting tracks and causing initial engagement of the sealing members with the ends of the pipe being tested; the provision of a multi-piston mechanism for applying sealing pressure on the pipe ends including simple, rugged and quickly operable means for rendering one or more of the pistons inoperative; and the provision of a fluid pressure actuated pipe tester and a control hookup therefor whereby the operation of the machine is simplified and speeded up.

The above and other objects of my invention will appear from the following description of several embodiments thereof, reference being had to the accompanying drawings, in which—

Figure 1 is a plan view of a pipe testing rack having one form of my improved mechanism embodied in the buggy.

Figure 2 is a side elevation of the apparatus shown in Figure 1, it being noted that the testing rack is broken apart and a portion of its length omitted in order to simplify the drawings.

Figure 3 is an enlarged vertical cross-sectional view of my improved sealing buggy having a manually operated buggy lock and initial seal mechanism.

Figure 4 is an enlarged vertical cross-sectional view taken substantially on line 4—4 of Figure 2, showing the locking pawls in elevated position to permit movement of the buggy on the track.

Figure 5 is a fragmentary horizontal cross-sectional view of the plunger operating cam and follower arrangement.

Figure 6 is a vertical cross-sectional view taken on line 6—6 of Figure 3.

Figure 7 is a view similar to Figure 6 but showing the piston locking keys in different positions.

Figure 8 is a view generally similar to Figure 3 but illustrating a buggy equipped with a single piston arrangement.

Figure 9 is a fragmentary side elevation of a hydrostatic pipe testing machine equipped with another embodiment of my improved automatic sealing pressure tester buggy.

Figure 10 is a vertical cross-sectional view taken on line 10—10 of Figure 9.

Figure 11 is an enlarged vertical cross-sectional view taken on line 11—11 of Figure 9 and illustrating the operating ring for the piston cut-out keys.

Referring particularly to Figure 1, the pipe being tested is seen at 1. The left end of the pipe 1 abuts against the stationary sealing plate 2 through which the testing fluid, commonly water, is supplied to the interior of the pipe 1. The water supply line 3 may be connected to any desired source of water under pressure, it being understood that suitable pressure controls will be provided in the usual manner. The test rack includes a supporting frame structure 4 having track portions 5 and 6. Racks 7 and 8 are located just inside of the tracks 5 and 6 and are co-extensive therewith. The supporting frame for the tester may take the form of a trough indicated at 9 in Figure 2 which will prevent water from draining onto the floor. The buggy which carries the automatic sealing mechanism is generally indicated at B and is provided with wheels 10 and 11 which run on the tracks 6 and 5 respectively. These wheels are mounted on a frame 12 which supports the sealing cylinder 13 and guides the sealing plunger 14 in its longitudinal movement. The end of the plunger 14 is provided with a sealing head 15 having a removable face plate 16 attached to the sealing head by bolts 17, see Figure 3, and grooved to accommodate packing 18 which provides an effective seal between the end of the pipe and the sealing head. For testing different diameters of pipe different face plates 16 may be employed.

The opposite end of the plunger 14 is flanged at 19 and has a tubular portion 20 which extends into the cylinder 13. Within cylinder 13 is disposed a plurality of pistons which may perhaps more properly be called thrust members. These thrust members, which resemble pistons but have holes thru their ends, are shown as being rings of different diameters which are arranged concentrically with respect to the axis of the cylinder and, preferably, concentrically with respect to each other and one within another. These thrust members are referred to hereinafter as pistons, for the sake of brevity. The inner piston 21 is secured to the flange 19 by screws 22, making a fluid tight joint, and fits over the tubular extension 20 of the plunger member 14. Suitable packing 23, in the form of a cup of leather or other suitable material, is clamped between the piston body 21 and the washer 24 by means of the lock nut 25. The skirt of the intermediate piston 26 has a sliding fit over the inner or small piston 21 and has a large hole 27 extending through its head. A suitable sealing means for the piston 26 is provided by the leather cup washer 28. This washer provides a sealed fit with the inner surface of the skirt of the large or outer piston 29 which in turn has a sliding fit on the outer surface of the intermediate piston 26. A large aperture 30 extends through the head of the piston 29. The end 31 of the cylinder 13 is closed except for the outlet through the pipe 32 which leads to the purge valve 33, the operation of which will be later explained, and a drain out opening below pipe 32 (Fig. 3) which is normally closed by a plug.

A passage 34 extends from the face of the sealing flange 16 through the plunger member 14, around the yoke portion 35' thereof (see Fig. 5), and out through the cylinder end of the plunger 14 and the projection 20 into the interior of the cylinder 13. Thus, it will be seen that, with the pipe 1 in the position shown in Figure 1, water which is admitted through the supply line 3 will pass through the pipe 1 and the passage 34 into the interior of the cylinder 13.

The frame 12 supports, on the same shaft as the front pair of wheels 10 and 11, two pawls 35 and 36 which are disposed above the racks 8 and 7 respectively and are provided with teeth 37 for engaging the rack teeth. A pawl lifting member 38 is provided with laterally extending arms 39 and 40 which extend downwardly at their ends and are pivotally secured to the pawls 35 and 36 at 41 (see Figs. 2 and 3). The lifter 38 carries a roller 42 which rides on the surface of the cam 44, which surface includes a flat portion 43 and an elevated lifting portion 43'. The upper end of the shaft supporting column 45 provides a bearing for the bottom surface of the cam 44 which is keyed to the cam shaft 46 and rotates therewith. The lifter 38 has a guiding sleeve 47 which is adapted to slide vertically on the shaft 46 and it will be seen that rotation of the shaft 46 by means of the handle 48 will cause the cam 44 to turn and will lift or lower the pawls 35 and 36 due to engagement of the cam with the follower roller 42. In full lines in Figure 3 the pawls are shown in elevated position with the roller 42 riding on the high portion 43' of the cam 44. When the handle 48 is turned in counter-clockwise direction, as viewed from above, the cam 44 will rotate permitting the roller 42 to drop down upon the flat portion 43 of the cam 44 and causing the teeth 37 of the pawls to engage the rack teeth thus locking the buggy against movement in a direction away from the pipe 1. The lower end of the shaft 46 is provided with an eccentric 49 which has a rotating fit in a square block 50 which in turn is disposed within the opening in the square yoke portion 35' of the plunger 14 (see Fig. 5). When the shaft 46 is turned the eccentric 49 will cause the block 50 to bear against one end or the other of the yoke 35' and thus rotation of the shaft 46 will be transmitted into longitudinal movement of the plunger 14, the direction of movement depending upon the direction of rotation of the shaft 46.

Before describing the mechanism for locking out certain of the pistons 21, 26 and 29, the mode of operation of the apparatus so far described will be explained. Assuming that a pipe is to be tested, it is placed in the position shown in Figure 1 and the buggy B is pushed along on the tracks 5 and 6 until the sealing face of the member 16 engages the end of the pipe. The operator may push buggy 5 along the tracks by grasping handle 48a (Figs. 1 and 4). The handle 48 is then turned by the operator, assuming that it has so far been in the position shown in Figures 1, 2 and 3 with the pawls elevated, in counter-clockwise direction. This causes the roller 42 to drop down upon the flat portion 43 of the cam 44 and engage the teeth of the pawls 37 with the teeth of the racks 7 and 8. At the same time rotation of the eccentric 49 causes the plunger 14 to be moved toward the end of the pipe 1, (into the dot-dash position shown in Fig. 5) and this will give a preliminary seal both between the right hand end of the pipe 1 and the sealing head 16 and between the left hand end of the pipe 1 and the seal plate or face 2. This seal need only be sufficient to prevent undue leakage of water while the pipe is being filled before testing.

The purge valve 33, which is merely a shut-off valve of any suitable type, is then opened by the operator and water under pressure admitted through the pipe 3. As the water fills the pipe 1 which is being tested, the hole 34 in the plunger 14, and the cylinder 13, it drives the entrapped air out through the purge valve and when water begins to run out of the purge valve it is closed. Next the water under testing pressure is applied through the pressure line 3 and this same pressure is effective through the entire pipe 1 and against the ends of the pistons 21, 26 and 29 in the cylinder 13. The pressure against these pistons, or part of them, as will be later explained, forces the plunger 14 to the left, Figures 1, 2 and 3, causing a sufficient sealing force to be applied against the ends of the pipe 1 to prevent leakage of the high pressure testing water.

The use of the three separate pistons 21, 26 and 29 permits the testing of pipes having a wide range of diameters in the same machine without any replacement or changing of parts. Square holes 51 and 52 extend down through the cylinder 13 and accommodate square keys 53 and 54. These keys are provided with enlarged upper end portions 55 to facilitate their removal and are notched out at 56 (see Figs. 6 and 7). When the keys are in the position shown in Figure 6 they extend down through the cylinder 13 adjacent the flattened side faces 21' and 21'' of the head portion of the piston 21. Thus, the piston 21 can have sliding movement axially of the cylinder 13 without any interference from the keys 53 and 54. These keys, however, do prevent rotary movement of piston 21 in the cylinder 13 due to their engagement with the flat vertical sides of the piston. When the parts are as shown in Figure 6, the end of the skirt of the intermediate piston 26 strikes against the side faces of the keys, thus limiting the movement of piston 26 away from the head 31 of cylinder and preventing the piston 26 from applying any force against the inner piston 21 and the sealing plunger 14. In like manner, the left hand end of the skirt of the outer piston 29 engages the keys 53 and 54 and is prevented from exerting any effective pressure against the piston 21. When the keys are in the position shown in Figure 6 the pressure of the water in the cylinder 13 is effective only against the small inner piston 21. This set up is employed in testing relatively small diameter pipes where a greater pressure on the end, such as would be caused by a piston of a diameter as great as that of pistons 26 or 29, might cause buckling or collapse of the pipe. In Figure 7 the keys 53 and 54 have each been turned 180° from the positions shown in Figure 6 and the cut-out portions 56 permit the skirt of the intermediate piston 26 directly to engage the enlarged end or head portion of the piston 21. With this set-up the area of the intermediate piston 26 is effective to apply a sealing force upon the plunger 14 through the small inner piston 21. As the effective piston area available is greater than that available when the keys are in the position shown in Figure 6, where only the smaller inner piston is working, the total sealing pressure on the plunger 14 will be greater and may be used for sealing pipes of larger diameter.

When the keys 53 and 54 are completely removed from the holes 51 and 52 all three of the pistons may work together and the effective area will be the area of the large piston 29. The ends of the skirts of both the intermediate piston 26 and the outer piston 29 are permitted to engage and push against the head of the piston 21 which has a sliding fit in the cylinder 13. This will give the maximum pressure on the plunger 14 and is employed when testing the largest size pipes for which the machine is designed.

From the above explanation it will be seen that by merely changing the position of the keys 53 and 54, or removing them completely, the sealing pressure can be very quickly and easily changed to the desired value. Danger of buckling pipes due to too great sealing pressure is eliminated and the proper sealing pressure obtained at all times. The single operating crank or handle 48 makes possible adjustment of the buggy position to accommodate different lengths of pipe with ease and dispatch and also makes possible the removal and replacement of successive pipes being tested by merely turning the handle 48 sufficiently to withdraw the sealing head 16 enough to remove the pipe but without lifting the pawls 35 and 36. When the next pipe is positioned the handle is turned to move the packing 18 into preliminary sealing contact with the pipe end.

In Figure 8 I have illustrated a pipe testing device which is substantially the same as that shown in Figures 1, 2, 3 and 4, except that the multi-cylinder arrangement is not used. This machine has only a single piston 57 operating in the cylinder 58 and connected directly to the plunger 59, which corresponds to plunger 14 of the mechanism of Figures 1, 2 and 3. The machine of Figure 8 has a single tooth pawl 60 operated by a mechanism which is substantially identical with that previously described. Similar parts of the two devices have been similarly numbered and it need only be pointed out that the machine of Figure 8 is intended for use where only a single size of pipe is to be tested and the piston 57 is made of the proper size to give the desired sealing pressure against the pipe end. The advantages of the single manual operating handle connected to the shaft 46 are fully obtained with this machine.

In Figures 9, 10 and 11 I have shown another embodiment of my sealing buggy which is intended primarily for use on large sizes of pipe. The entire machine is more rugged than the previously described apparatus and the buggy locking and preliminary sealing pressure establishing mechanisms are operated by fluid pressure such as compressed air. The buggy includes a frame structure 61 mounted on wheels 62 which are supported on tracks 63. A motor M is geared to one of the wheels 62 and is adapted to move the buggy on the tracks. A longitudinally extending anchoring bar 64 projects upwardly between the rails 63 and is provided with spaced holes 65 throughout its length. Another anchoring bar 66, similar to bar 64 and having holes similarly located, is supported above the buggy by any suitable framework (not shown). The frame of the buggy is provided with a pair of upwardly extending flanges 67 which are disposed on opposite sides of the top bar 66 and a pair of similar flanges 68 which extend downwardly from the frame 61 of the buggy on opposite sides of the bottom bar 64. These flanges support the locking pins 69 and 70 which are adapted to slide in their supports and be moved into and out of the holes in the anchoring or locking bars 64 and 66. The pin 69 is attached to piston rod 71 of the piston 72 in the cylinder 73. An operating lever 74 is pivoted on the buggy frame at 75 and its lower end is connected at 76 to a transverse rod 77 which slides in a suitable bearing in the frame 61. The downwardly extending arm 78 is secured at its upper end to the sliding bar 77 and at its lower end carries the pin 70.

From the above description it will be seen that when the piston 72 is moved to the left (Fig. 10) the top pin 69 will be moved to the left through one of the holes in the top locking bar 66 and the bottom pin 70 will be moved to the right through one of the holes 65 in the bottom locking bar 64. The cylinder 73 is provided with suitable fluid pressure connections 79 and 80 which are connected through a valve, generally indicated at V which will be later described more fully, to a suitable source of fluid under pressure.

The sealing head 81 which engages the end of the pipe 82 being tested is carried by a plunger 83 in the same manner as previously described in connection with the apparatus of Figures 1, 2 and 3. The cylinder 84 carries three pistons, or more than three if desired, which are supported and arranged in the same manner as the pistons 21, 26 and 29 in Figure 3. The purge valve 85 performs the same function as the purge valve shown in the other embodiments of my invention.

Referring particularly to Figures 9 and 11, it will be seen that a different arrangement is employed for changing the effective area of the piston which exerts the sealing pressure on the plunger 83 and the sealing head 81. The adjusting arrangement of Figures 9, 10 and 11 comprises a ring 86 mounted to rotate on the frame of the cylinder 84 and having an operating handle 87. The ring 86 is formed with curved elongated slots 88 and 89 into which extend respectively pins 90 and 91. These pins 90 and 91 are secured to the sliding keys 92 and 93 which are guided for radial in and out movement by suitable apertures or slideways 94 and 95 in the cylinder housing 84. The inner ends of the sliding keys 92 and 93 are cut on a radius as shown in Figure 11 and it will be seen that movement of the handle 87 in clockwise direction will cause the keys 92 and 93 to move apart and be withdrawn away from the center of the cylinder 84. Movement in counter-clockwise direction will cause the keys to move together towards the center of the cylinder.

As seen in Figure 9 at 96, indicia are preferably provided on the stationary portion of the cylinder frame and a finger 97 attached to the ring 86 provides means for indicating to the operator the position of the sliding keys 92 and 93. When the keys are in the position shown in Figure 11 the two outer pistons 98 and 99 are locked out while the center small piston 100 is permitted to move in its bearing within the locked out middle piston 99. As noted above, the construction and arrangement of the pistons 98, 99 and 100 is the same as that shown in Figure 3. By withdrawing the locking keys 92 and 93 until their inner ends clear the skirt of the intermediate piston 99 but do not clear the skirt of the outer piston 98, the area of the intermediate piston will be available for establishing the sealing pressure against the pipe end. In like manner, by completely withdrawing the keys 92 and 93 so that their inner ends clear the skirt of the outer piston 98, the maximum sealing force is brought into action. The indicia 96 may be calibrated to indicate the proper setting of the keys for different sizes of pipe thus making it necessary for the operator only to set the handle 87 so that the pointer 97 will point to the size pipe which he desires to test.

The preliminary engagement of the sealing head 81 with the end of the pipe 82 is effected by fluid pressure operating in a pair of similar cylinders 101 and 102. The cylinder 101 is clearly seen in Figure 10 and the cylinder 102 is indicated in dotted lines in Figure 9. The common piston rod 103 carries at one end a piston disposed in the cylinder 101 and at its opposite end a piston disposed in the cylinder 102. An operating arm 104 is clamped to the piston rod 103 at its upper end and to the plunger 83 at its lower end. The fluid pressure conducting pipe 105 leads from the end of cylinder 101 to the valve V and a similar conduit 106 connects the end of the cylinder 102 to the valve V. When, for example, the valve V is moved so that the pipe 106 is connected to a source of actuating pressure (not shown) through the pipe 107 (this position of the valve being shown in Fig. 9), and the pipe 105 is connected to exhaust to atmosphere through the valve V, the fluid pressure will move the piston rod 103 and the plunger 83 to the left and push the sealing head 81 into preliminary sealing engagement with the end of the pipe 82. As the pipes 79 and 80 which lead to the operating cylinder 73 for the buggy locking mechanism are connected into the pipes 105 and 106 it will be seen that when the valve V is in the position shown in Figure 9 fluid pressure will be connected through the pipe 80 to the cylinder 73 and the other end of this cylinder will be connected to exhaust through the pipe 79. Pressure applied through the pipe 80 causes the pins 69 and 70 to move into locking position in the holes in the locking bars 64 and 66.

Thus, in operating the machine shown in Figures 9, 10 and 11, the operator first moves the handle 87 to give the desired sealing pressure for the size of pipe to be tested. The pipe is then positioned between the two sealing heads of the machine and the buggy is moved by motor M up into its approximate sealing position. The valve V is then turned into the position shown in full lines in Figure 9 and fluid under pressure will be applied through the pipe 80 to the cylinder 73 causing the pins 69 and 70 to press against the sides of bars 64 and 66 and to enter into the holes in the locking bars when the pins come into alignment with and enter said holes, thus preventing movement of the buggy away from the pipe. At the same time fluid pressure is applied through the pipe 106 to the cylinder 102 and the pipe 105 is connected to the atmosphere. This will move the piston rod 103 and the plunger 83 toward the pipe and cause preliminary sealing engagement between the pipe ends and the sealing heads. The purge valve 85 is opened and the water turned on filling the pipe, cylinder 84 and connecting passages. When these are completely filled the purge valve is closed and the testing pressure applied. This testing pressure is, of course, effective against a piston area in the cylinder 84 which depends upon the position of the locking keys 92 and 93 which position is regulated according to the diameter of pipe being tested.

The apparatus just described is particularly effective in testing large pipe as it provides a mechanism which is susceptible to very rapid and accurate operation. When the pipe has been tested and is to be removed it is only necessary to throw the valve V in the direction of the arrow into the position shown in dotted lines in Figure 9. This will reverse the connections and withdraw the plunger 83 and the locking pins 69 and 70 preparatory to testing another pipe.

Although I have described the illustrated embodiments of my invention in considerable detail it will be understood by those skilled in the art that numerous variations and modifications may be made in the specific type of apparatus employed and in the structural details thereof without departing from the spirit of my invention. I do not, therefore, wish to be limited to the particular forms of my improved testing apparatus herein shown and described but claim as my invention all embodiments thereof coming within the scope of the appended claims.

I claim:

1. In testing apparatus of the type described, a track, a buggy supported on said track and movable longitudinally thereof, a sealing head carried by said buggy and movable longitudinally thereof, means for locking said buggy to prevent movement of the buggy on said track in one direction, means for imparting longitudinal movement to said sealing head, and means for simultaneously operating said buggy locking means and said sealing head moving means in predetermined timed relation.

2. In testing apparatus of the type described, a track, a buggy supported on said track and movable longitudinally thereof, a sealing head carried by said buggy and movable longitudinally thereof, means for locking said buggy to prevent movement of the buggy on said track in one direction, means for imparting longitudinal movement to said sealing head, an operating handle, and means operated by movement of said handle for simultaneously operating said buggy locking means and said sealing head moving means.

3. In testing apparatus of the type described, a track, a sealing buggy supported on said track and movable longitudinally thereof, a sealing member on said buggy, fluid pressure actuated means for moving said sealing member into and out of sealing position, means for locking said buggy against movement on said track in one direction, fluid pressure actuated means for operating said buggy locking means, and means for controlling said fluid pressure actuated means.

4. In testing apparatus of the type described, a track, a sealing buggy supported on said track and movable longitudinally thereof, a sealing member on said buggy, fluid pressure actuated means for moving said sealing member into and out of sealing position, means for locking said buggy against movement on said track in one direction, fluid pressure actuated means for operating said buggy locking means, a source of supply of fluid under pressure, conduits extending from said source to said fluid pressure actuated means, and a control valve in said conduits adapted simultaneously to control the application of fluid pressure from said source to each of said fluid pressure actuated means.

5. In a hydrostatic testing apparatus of the type described, the combination of a sealing member adapted to engage an opening in a hollow object to be tested, a cylinder, a plunger connected to said sealing member and extending into said cylinder, a plurality of pistons of different diameters in said cylinder, means for locking out one or more of said pistons from operating connection with said plunger, there being means for conducting fluid under pressure to said cylinder.

6. In a hydrostatic testing machine, a pair of spaced sealing heads adapted to have an article to be tested positioned therebetween, and means for moving one of said sealing heads toward the other, said means including a plurality of concentric pistons disposed in a single cylinder, operating connections between said pistons and said one of said sealing heads, and means for locking out one or more of said pistons to vary the effective piston area thus varying the total sealing pressure applied to said one of said sealing heads.

7. In a hydrostatic testing machine, a pair of sealing heads mounted in spaced relation, one of said heads having a passage through which testing fluid may be discharged into an article to be tested and the other of said heads being movable toward and away from said first named head to complete the sealing of the article to be tested, a plunger supporting said movable head, a cylinder, a first piston in said cylinder, operating connections between said first piston and said plunger, a fluid conducting conduit extending through said movable head and into said cylinder on the head end of said first piston, a second piston slidably mounted in said cylinder on said first piston and of larger diameter than said first piston, said second piston having a passage extending through its head portion and being adapted to engage said first piston and apply a sealing force thereagainst when fluid under pressure is conducted to the cylinder through said conduit, and means for locking said second piston against sealing force producing engagement with said first piston.

8. In a hydrostatic testing machine, a pair of sealing heads mounted in spaced relation, one of said heads having a passage through which testing fluid may be discharged into an article to be tested and the other of said heads being movable toward and away from said first named head to complete the sealing of the article to be tested, a plunger supporting said movable head, a cylinder, a first piston in said cylinder, operating connections between said first piston and said plunger, a fluid conducting conduit extending through said movable head and into said cylinder on the head end of said first piston, a second piston slidably mounted in said cylinder on said first piston and of larger diameter than said first piston, said second piston having a passage extending through its head portion and being adapted to engage said first piston and apply a sealing force thereagainst when fluid under pressure is conducted to the cylinder through said conduit, and means for locking said second piston against sealing force producing engagement with said first piston, said locking means including a key slidably supported in the wall of said cylinder and means for moving said key into and out of locking engagement with said second piston.

9. In a hydrostatic testing machine, a pair of sealing heads mounted in spaced relation, one of said heads having a passage through which testing fluid may be discharged into an article to be tested and the other of said heads being movable toward and away from said first named head to complete the sealing of the article to be tested, a plunger supporting said movable head, a cylinder, a first piston in said cylinder, operating connections between said first piston and said plunger, a fluid conducting conduit extending through said movable head and into said cylinder on the head end of said first piston, a second piston slidably mounted in said cylinder on said first piston and of larger diameter than said first piston, said second piston having a passage extending through its head portion and being adapted to engage said first piston and apply a sealing force thereagainst when fluid under pressure is conducted to the cylinder through said conduit, and means for locking said second piston against sealing force producing engagement with said first piston, said locking means including a notched key removably projecting into said cylinder through an aperture therein, and adapted, when in one position in said aperture to stop said second piston from sealing engagement with said first piston and when in another position in said aperture to permit said second piston to move through the notch in the key and engage said first piston to increase the total piston diameter effective to establish sealing pressure on said movable head.

10. In a hydrostatic testing machine, a pair of sealing heads mounted in spaced relation, one of said heads having a passage through which testing fluid may be discharged into an article to be tested and the other of said heads being movable toward and away from said first named head to complete the sealing of the article to be tested, a support for said movable head, a cylinder, a first piston in said cylinder, operating connections between said first piston and said support for said movable head, a fluid conducting conduit extending through said movable head and into said cylinder on the head end of said first piston, a second piston slidably mounted in said cylinder on said first piston and of larger diameter than said first piston, said second piston having a passage extending through its head portion and being adapted to engage said first piston and apply a sealing force thereagainst when fluid under pressure is conducted to the cylinder through said conduit, and means, operable from outside of said cylinder, for locking said second piston against sealing force producing engagement with said first piston.

11. In apparatus for causing sealing engagement between two elements, one of which is a movable sealing member, a cylinder, a plurality of concentric pistons in said cylinder, the innermost of said pistons being connected to a piston rod or the like extending out of said cylinder, the inner surface of the skirt of each succeeding outer piston having a sliding sealed engagement with an outer surface of the next inner piston, the head of each piston having a fluid passage therethrough, and operating connections between said piston rod and said sealing member.

12. In apparatus for causing sealing engagement between two elements, one of which is a movable sealing member, a cylinder, a plurality of concentric pistons in said cylinder, the innermost of said pistons being connected to a piston rod extending out of said cylinder, the inner surface of the skirt of each succeeding outer piston having a sliding sealed engagement with an outer surface of the next inner piston, the head of each piston having a fluid passage therethrough, means operable from outside of said piston for restricting the movement of one or more of said pistons, and operating connections between said piston rod and said sealing member.

13. In apparatus for causing sealing engagement between two elements, one of which is a movable sealing member, a cylinder, a plurality of concentric pistons in said cylinder, the innermost of said pistons being connected to a piston rod or the like extending out of said cylinder, the inner surface of the skirt of each succeeding outer piston having a sliding sealed engagement with an outer surface of the next inner piston, the head of each piston having a fluid passage therethrough, a key extending through a slot in the cylinder wall and adapted when in one position to limit movement of the outermost piston and when in another position to permit unrestricted movement of said outermost piston, and operating connections between said piston rod and said sealing member.

14. In apparatus for causing sealing engagement between two elements, one of which is a movable sealing member, a cylinder, a plurality of concentric pistons in said cylinder, the innermost of said pistons being connected to a piston rod or the like extending out of said cylinder, the inner surface of the skirt of each succeeding outer piston having a sliding sealed engagement with an outer surface of the next inner piston, the head of each piston having a fluid passage therethrough, a key extending through a slot in the cylinder wall and adapted when in one position to limit movement of the outermost piston and when in another position to permit unrestricted movement of said outermost piston, a pin extending from said key, a key operating member having a cam slot engaging said pin, said operating member being rotatable about the center of said cylinder, and said cam slot being adapted to move said pin and key radially of said cylinder, and indicating means on said cylinder and operating member for indicating the position of said key in said cylinder.

CHARLES A. LONGSTREET.